(12) United States Patent
Larsson

(10) Patent No.: US 9,252,926 B2
(45) Date of Patent: Feb. 2, 2016

(54) SYSTEM AND METHOD FOR RETRANSMISSIONS IN A WIRELESS COMMUNICATIONS SYSTEM

(71) Applicant: Telefonaktiebolaget L M Ericsson (publ), Stockholm (SE)

(72) Inventor: Peter Larsson, Solna (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 46 days.

(21) Appl. No.: 13/705,494

(22) Filed: Dec. 5, 2012

(65) Prior Publication Data

US 2013/0148569 A1  Jun. 13, 2013

Related U.S. Application Data

(62) Division of application No. 12/530,301, filed as application No. PCT/SE2008/000181 on Mar. 6, 2008, now Pat. No. 8,381,061.

(30) Foreign Application Priority Data

Mar. 6, 2007 (SE) .................................. 0700583
Mar. 6, 2007 (SE) .................................. 0700584

(51) Int. Cl.
*H04L 1/18* (2006.01)
*H04L 1/20* (2006.01)
(Continued)

(52) U.S. Cl.
CPC ............... *H04L 1/1825* (2013.01); *H04B 7/15* (2013.01); *H04L 1/0076* (2013.01);
(Continued)

(58) Field of Classification Search
CPC ........................... H04L 1/1825; H04L 1/20

USPC .................................................. 714/748–751
See application file for complete search history.

(56) References Cited

U.S. PATENT DOCUMENTS 3,646,580 A * 2/1972 Fuller et al. .................... 455/524
4,058,838 A * 11/1977 Crager et al. .................. 358/425
(Continued)

FOREIGN PATENT DOCUMENTS

WO  2004107693 A1  12/2004
WO  2005008947 A1  1/2005
(Continued)

OTHER PUBLICATIONS

Larsson, P. et al. "Multi-User ARQ." IEEE 63rd Vehicular Technology Conference, 2006, VTC 2006—Spring, May 7-10, 2006, pp. 2052-2057, vol. 4.
(Continued)

*Primary Examiner* — Joseph D Torres
(74) *Attorney, Agent, or Firm* — Patent Portfolio Builders, PLLC

(57) ABSTRACT

A method for a communications system, with a sender, which transmits data as packets to a receiver. The receiver transmits quality values to the sender representing the reception quality of packets received with errors. The receiver stores information regarding a number of received data packets, and there is a relay transceiver between the sender and the receiver. Both the relay transceiver and the sender can encode data packets into composite packets, M and to transmit composite packets to the receiver. Said stored information in the receiver comprises the data in correctly received packets and information regarding the reception quality of packets received with errors and the data of those packets, and the stored information is used by the receiver to decode composite packets, thereby extracting the data in the packets of the composite packets.

15 Claims, 9 Drawing Sheets

(51) Int. Cl.
*H04L 1/22* (2006.01)
*H04L 1/16* (2006.01)
*H04B 7/15* (2006.01)
*H04L 1/00* (2006.01)

(52) U.S. Cl.
CPC ........... *H04L 1/1607* (2013.01); *H04L 1/1819* (2013.01); *H04L 1/1845* (2013.01); *H04L 1/22* (2013.01); *H04L 1/0026* (2013.01); *H04L 1/1838* (2013.01); *H04L 1/1848* (2013.01); *H04L 2001/0097* (2013.01)

(56) References Cited

U.S. PATENT DOCUMENTS

| | | | |
|---|---|---|---|
| 4,188,616 A * | 2/1980 | Kazami et al. | 714/762 |
| 4,442,461 A * | 4/1984 | Shirai et al. | 386/254 |
| 5,311,541 A * | 5/1994 | Sanderford, Jr. | 375/131 |
| 5,566,022 A * | 10/1996 | Segev | 398/107 |
| 6,243,846 B1 * | 6/2001 | Schuster et al. | 714/776 |
| 6,275,488 B1 * | 8/2001 | Cudak et al. | 370/347 |
| 6,359,877 B1 * | 3/2002 | Rathonyi et al. | 370/349 |
| 6,609,181 B2 * | 8/2003 | James et al. | 711/156 |
| 7,000,021 B1 * | 2/2006 | Radhakrishnan et al. | 709/230 |
| 7,003,710 B2 * | 2/2006 | Tomaru et al. | 714/751 |
| 7,181,667 B2 * | 2/2007 | Argyropoulos et al. | 714/748 |
| 7,584,397 B2 * | 9/2009 | Terry | 714/748 |
| 7,639,639 B2 * | 12/2009 | Herdin | 370/315 |
| 7,697,484 B2 * | 4/2010 | Kim et al. | 370/334 |
| 7,702,280 B2 * | 4/2010 | Takeda et al. | 455/7 |
| 7,924,761 B1 * | 4/2011 | Stevens | 370/315 |
| 7,929,988 B2 * | 4/2011 | Horiuchi et al. | 455/550.1 |
| 7,940,728 B2 * | 5/2011 | Horiuchi et al. | 370/335 |
| 7,970,344 B2 * | 6/2011 | Horiuchi et al. | 455/11.1 |
| 8,000,651 B2 * | 8/2011 | Horiuchi et al. | 455/11.1 |
| 8,351,334 B2 * | 1/2013 | Larsson et al. | 370/236 |
| 2002/0197969 A1 * | 12/2002 | Moon et al. | 455/211 |
| 2004/0242154 A1 * | 12/2004 | Takeda et al. | 455/16 |
| 2007/0245204 A1 | 10/2007 | Yomo et al. | |
| 2008/0056255 A1 * | 3/2008 | Birman et al. | 370/390 |
| 2008/0250299 A1 * | 10/2008 | Maillet et al. | 714/776 |

FOREIGN PATENT DOCUMENTS

| | | |
|---|---|---|
| WO | 2006071187 A2 | 7/2006 |
| WO | 2007/008123 A1 | 1/2007 |

OTHER PUBLICATIONS

Navaie, K. et al. "Induced Cooperative Multi-user Diversity Relaying for Multi-hop Cellular Networks." IEEE 63rd Vehicular Technology Conference, 2006, VTC 2006—Spring, May 7-10, 2006, pp. 658-662, vol. 2.

Larsson, P. et al. "Coded Bi-directional Relaying." IEEE 63rd Vehicular Technology Conference, 2006, VTC 2006—Spring, May 7-10, 2006, pp. 851-855, vol. 2.

Navaie, K. et al. "Multi-User Diversity in Multi-Hop Cellular Networks." Proceedings of the Canadian Workshop on Information Theory (CWIT'05), 2005, pp. 1-4.

Castura, J. et al. "Rateless Coding for Wireless Relay Channels." IEEE Transactions on Wireless Communications, vol. 6, No. 5, pp. 1638-1642, May 2007.

Zhao, B. et al. "Practical Relay Networks: A Generalization of Hybrid-ARQ." IEEE Journal on Selected Areas in Communications, vol. 23, No. 1, pp. 7-18, Jan. 2005.

Peng. C. et al. "SNCC: A Selective Network-Coded Cooperation Scheme in Wireless Networks." 2007 IEEE International Conference on Communications (ICC '07), pp. 4219-4224, Jun. 24-28, 2007.

Yi, L et al. "A New Cooperative Communication MAC Strategy for Wireless Ad Hoc Networks." 6th IEEE/ACIS International Conference on Computer and Information Science, 2007 (ICIS 2007), pp. 569-574, Jul. 11-13, 2007.

Ahmad, S. A. et al. "A Practical Hybrid-ARQ Protocol using Noncoherent Orthogonal Modulation." 41st Annual Conference on Information Sciences and Systems, 2007 (CISS '07), pp. 484-489, Mar. 14-16, 2007.

Aghadavoodi, J., et al., "Effective Block Recovery Schemes for ARQ Retransmission Strategies", 5th IEEE International Symposium on Personal, Indoor and Mobile Radio Communications, Wireless Networks—Catching the Mobile Future, Sep. 18, 1994, pp. 781-785, vol. 3, IEEE.

Hausl, C, et al. "Iterative Newtork and Channel Decoding for the Two-Way Relay Channel", IEEE International Conference on Communications, Jun. 1, 2006, pp. 1568-1573, vol. 4, IEEE.

Tau, C.-S., et al., "Performance evaluation of the loss-collected retransmission scheme in reliable multicast protocol", Communications, IEE Proceedings, Jun. 2, 2006, pp. 376-382, vol. 153, issue 3, IET.

Cheng, W., et al., "Hybrid Solution: A FEC Algorithm for Fault Tolerant Routing in Sensor Networks", First International Conference on Communications and Networking in China, Oct. 25, 2006, pp. 1-5, IEEE.

* cited by examiner

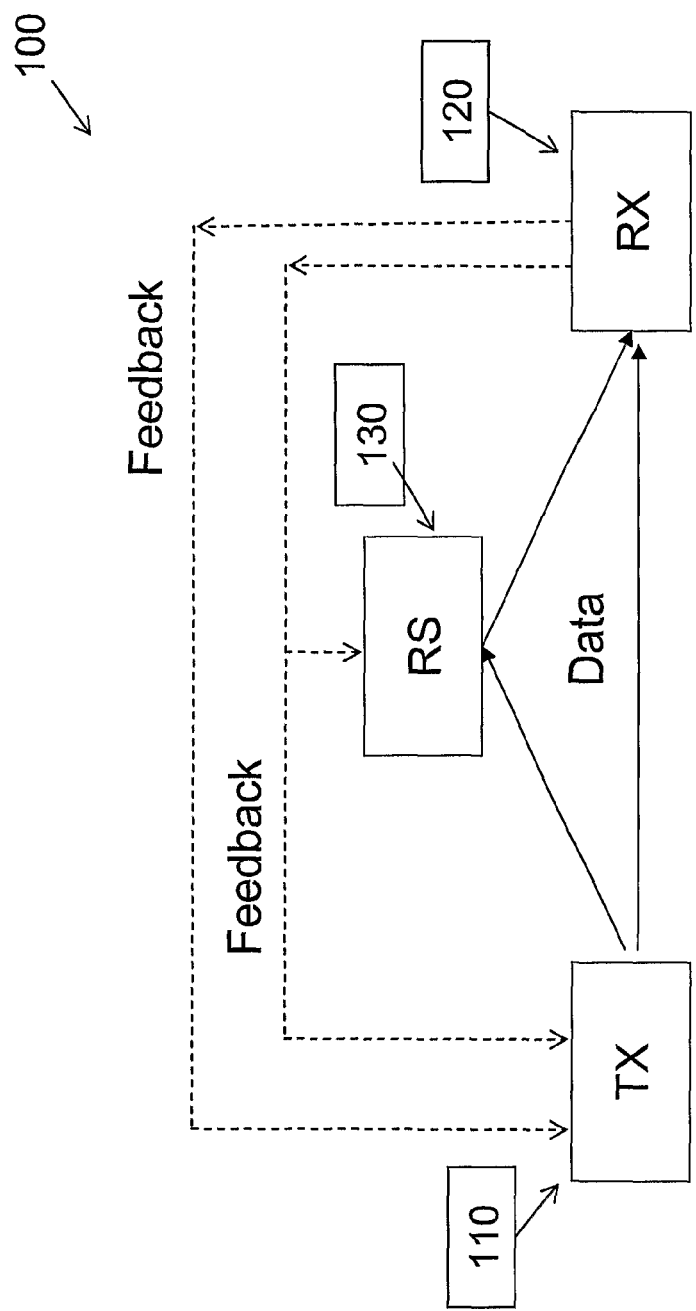

Equation [3]:

$$e^{L_1(r_2,r_3)} = \frac{P(x_1=0|r_2,r_3)}{P(x_1=1|r_2,r_3)} = \frac{P(x_3=0|r_3)P(x_2=0|r_2)+P(x_3=1|r_3)P(x_2=1|r_2)}{P(x_3=0|r_3)P(x_2=1|r_2)+P(x_3=1|r_3)P(x_2=0|r_2)} = \frac{1+e^{L_2+L_3}}{e^{L_2}+e^{L_3}}$$

Fig 5

SYSTEM AND METHOD FOR RETRANSMISSIONS IN A WIRELESS COMMUNICATIONS SYSTEM

This application is a divisional filing of, and claims priority to, U.S. patent application Ser. No. 12/530,301, filed Sep. 8, 2009, which issued as U.S. Pat. No. 8,381,061, and which was a national stage filing of PCT Application PCT/SE2008/000181, published as WO 2008/108708, filed Mar. 6, 2008.

The above-referenced PCT application (and this application) claim priority to Swedish patent applications No. SE 0700583-8 and SE 0700584-6, both filed Mar. 6, 2007.

TECHNICAL FIELD

The present invention concerns wireless communications systems, in particular systems in which use is made of a relay transceiver between a first and a second transceiver.

BACKGROUND

In the field of wireless communications systems, i.e. radio systems, the use of relay transmitters is a well known way of enhancing the range of a "hop" or a link, i.e. a connection between a transmitter and one or more receivers. A relay transmitter, as opposed to a repeater station, is thus a transmitter which can pick up transmissions, demodulate and re-modulate them, and then retransmit them to the intended receiver in order to overcome geographical obstacles between the transmitter and the receiver.

In the case of encoded transmissions, for example so called FEC coding (Forward Error Correction), the relay transmitter decodes the transmissions in connection with the demodulation, and re-encodes them in connection with the re-modulation, and then retransmits the transmissions to the intended receiver.

In wireless communications systems, various types of retransmission schemes are often used in order to ensure that information from a transmitter reaches the receiver in a proper and intended fashion.

For single links, i.e. ones which do not use relay transmitters, there is a range of different principles for retransmission, such as for example, different kinds of ARQ (Automated Repeat Request), and HARQ (Hybrid ARQ).

When it comes to systems which use relay transmitters, or more properly relay "transceivers", since the relay unit can both receive and transmit, the field of retransmission schemes for such systems is not as well explored as for systems which involve only a connection between a transmitter and a receiver.

SUMMARY

Thus, as has emerged from the description above, there is a need for a solution by means of which wireless communications which utilize a relay transceiver can be improved upon.

This need is addressed by the present invention in that it discloses a method for use in a wireless communications system in which there is a first transceiver, a sender, which transmits data as packets to a second transceiver, a receiver.

According to the inventive method, the receiver transmits quality values to the sender which represent the reception quality of data packets which the receiver has received with errors. The receiver also stores information regarding a number of received data packets, and the inventive method also comprises the use of at least a third transceiver as a relay transceiver which can receive and forward transmissions between the sender and the receiver.

Both the relay transceiver and the sender of the method are able to encode data packets into one or more so called composite packets, and both are also able to transmit the composite packets to the receiver.

The stored information in the receiver comprises the data in correctly received packets and information regarding the reception quality of packets received with errors, as well as non-decoded information ("soft" information) representative of the data of those packets. The stored information in the receiver is used by the receiver to decode composite packets, thereby extracting the data in the packets which comprise the composite packets.

Thus, according to the invention, a relay transceiver may play a more active role than previously known relay transceivers, in that it, for example, can code and re-transmit packages to the receiver, by means of which the end-to-end quality of the communication will be enhanced.

This and other advantages of the present invention will emerge even more clearly from the appended detailed description.

In one embodiment of the invention, the quality values that the receiver transmits to the sender which are representative of the reception quality of data packets which the receiver has received with errors are so called NACK messages for the data packets in question. In another embodiment' the quality values are values which represent one of a plurality of reception quality values of the data packet in question at the receiver.

In addition, in one embodiment of the invention, the quality values from the receiver regarding packets received in error are used in order to decide what packets to encode and subsequently send as composite data packets to the receiver. The composite packets are encoded in such a way that the receiver's decoding can identify the individual packets in the composite packet, as well as the data in those packets. Typically, the composite packets are packets that comprise at least one previously transmitted packet which has been received by the receiver with errors.

The invention also discloses a transceiver for use as a sender or relay station in a system of the invention, as well as a transceiver for use as a user terminal, a receiver, in the system of the invention.

BRIEF DESCRIPTION OF THE DRAWINGS

The invention will be described in more detail in the following, with reference to the appended drawings, in which FIGS. 2a and 2b show events in the system of FIG. 1, FIG. 5 shows an equation.

DETAILED DESCRIPTION

Figure 1:
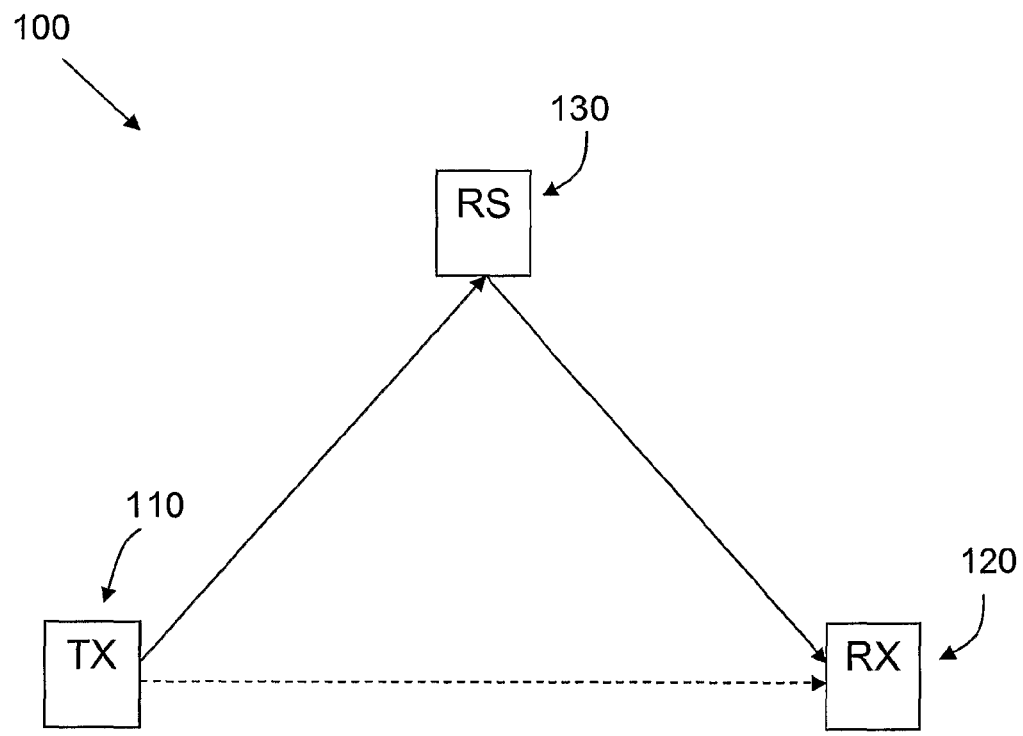
FIG. 1 shows a basic system in which the invention may be applied.

FIG. 1 shows a basic overview of a system 100 in which the present invention may be applied. As seen in FIG. 1, the system involves a first transceiver 110, "TX", which has data to send to a second transceiver 120 in the system, "RX".

As is also shown in FIG. 1, the system 100 of the invention includes a transceiver which acts as a relay sender 130, "RS". Basic Function of the Invention.

The invention will be described in depth in this text, but since it is believed that an initial description of a basic function of the invention will enhance the reader's understanding of the total invention, such a description will be offered first, with reference to FIG. 1.

In the system 100, traffic, usually in the form of data packets from the transceiver 110, is transmitted to the destination of the traffic, i.e. the transceiver 120. The traffic may also be "overheard" by the relay transceiver RS 130.

If the transceiver or "receiver" 120 is able to properly receive the data packets which are transmitted from the sender 110, there will be no need for retransmission of those packets from the sender. Data packets from the sender to the receiver can either be sent with no coding at all, or with some kind of error correcting code, such as for example FEC-coding, Forward Error Correction. The term "properly receive" as used here can be taken to mean either correct reception of data packets which are transmitted with no coding, or, in the case of data packets which are transmitted with, for example, FEC-coding, that the data packets have been received and properly decoded, i.e. without errors. A term which will be used in this text to indicate the opposite of "properly received" is the term "received with errors".

Thus, according to the present invention, in the case of data packets which the receiver 120 receives with errors, due to, for example, poor reception quality, the receiver 120 stores the data of those packets, as well as so called "soft information" of those packets. The notion of "soft information" for a packet will be explained in further detail later in this text. In addition, the receiver also stores data from properly received packets.

For practical purpose, properly received packets or properly received composite packets, as well as packets or composite packets received with errors and represented by soft information may be stored by the receiver for a limited time, such that opportunities are given to use the stored information as a priori information in the decoding of subsequently received composite packets. The time for this may for example, be not limited to, different fixed times managed by timers that may be specific for the type of information, or a sending node may send a message indicating what information to discard, or the reciprocal, what to keep.

As has emerged from the description above, and as is also shown in FIG. 1, the system for which the invention is intended uses a relay station or relay transceiver 130, which, compared to the receiver 120, suitably is placed closer or in a more advantageous position to the sender 110 with respect to reception conditions.

If the receiver 120 receives data packets with errors, the relay transceiver 130 may be used to re-transmit those data packets, as well as re transmitting packets which have not reached the receiver at all.

The relay transmitter accomplishes its retransmissions of packets by means of feedback from the receiver 120 regarding what has been received properly, or alternatively, feedback regarding what has been received with errors. If the feedback from the receiver 120 to the relay transceiver 130 includes information on data packets that have been properly received, the relay transceiver may use this to determine which data packets that need to be re-transmitted.

According to the present invention, the sender 110 and the relay transceiver 130 carry out their respective retransmissions to the receiver 120 by means of coding multiple packets into one or more so called "composite packets", a notion which will be explained in more detail below, but which are packets which comprise at least one packet which has been received in error by the receiver 120. The coding may, for example, be a weighted linear addition of two or more vectors in a continuous or finite field.

An example of an addition in a finite field is the bitwise XOR operation, representing an addition in GF(2). Based on the composite packets from the relay transceiver 130, which contain outstanding packets, i.e. packets received with errors or not at all, and the previously mentioned stored so called "soft information", together with stored data from properly received packets, the receiver 120 can decode the outstanding packets.

Composite packets which are received by the receiver 120 from the relay transceiver 130 but which the receiver 120 is unable to decode, will according to the present invention be treated by the receiver 120 as any other packets which are received with errors, i.e. they will be stored along with their "soft information", and the receiver will send feedback information that those packets have been non-decodable.

Detailed Function of the Invention

A more detailed description of the function of the invention will now be given, initially with reference to FIG. 2a, which shows a system such as the one 100 of FIG. 1 at four points in time T1-T4. Although the description will only be given with the use of one relay station and two data packets, it should be understood that this is merely for the sake of clarity, the invention may be applied in a system with more than one relay station, and for the transmission of a basically arbitrary amount of data packets.

Figure 2A:
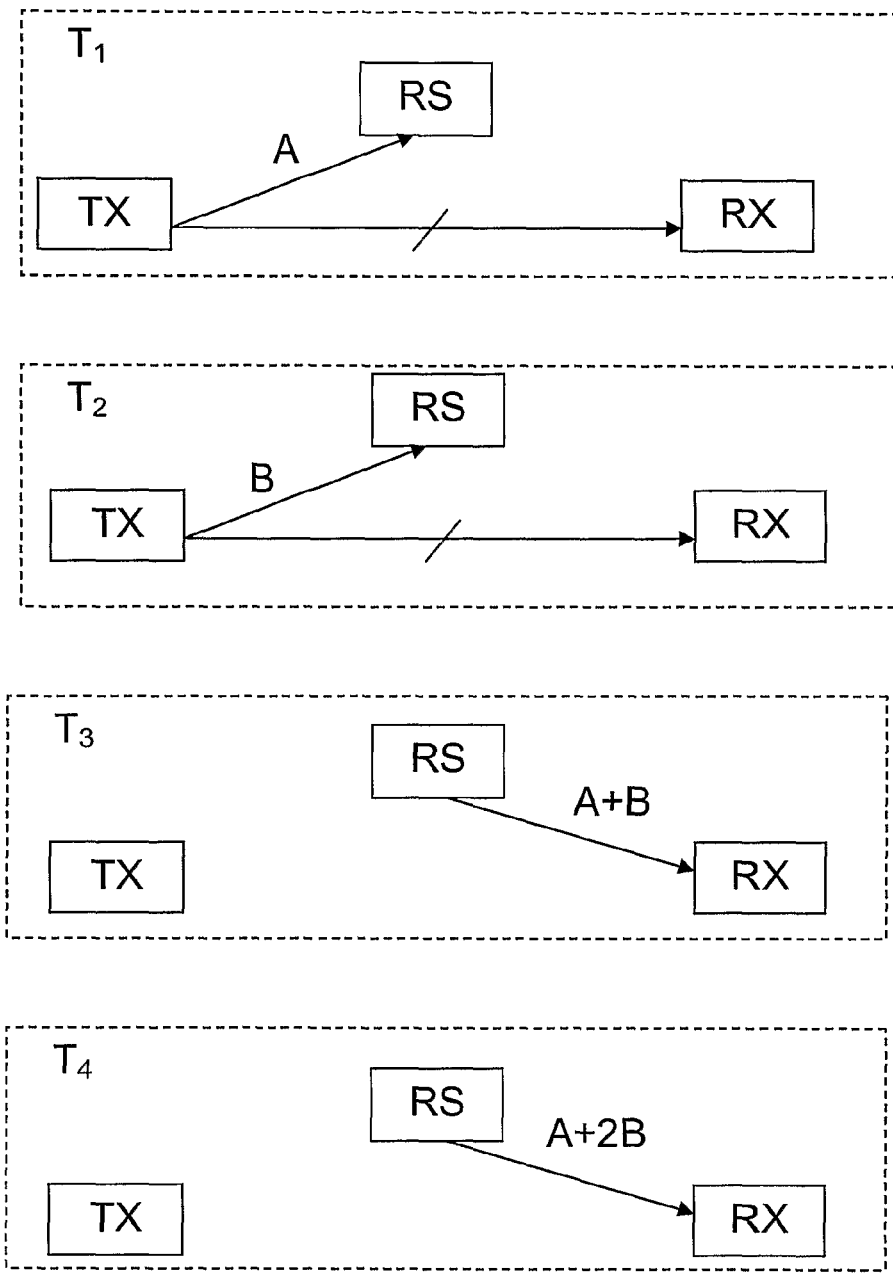

Turning now to FIG. 2a, at T1 the sender, "TX", transmits a first data packet, shown as "A" in FIG. 2a, which is properly received by the relay transceiver, "RS". The first data packet "A" is also received by the intended receiver, "RX", which however receives it with errors, due to, for example, poor signal quality.

At T2, the sender, "TX", transmits a second data packet, shown as "B" in FIG. 2a, which is properly received by the relay transceiver, "RS". The second data packet "B" is also received by the intended receiver, "RX", but with errors.

In both cases, the receiver "RX" stores the previously mentioned "soft information" about the packets A and B, which can be done since the receiver has managed to receive the packets, albeit with errors. The invention's notion of "soft information" will be explained in detail below, but may be briefly explained as follows: the soft information of a data bit or a data symbol is a value that represent the quality of the data bit or data symbol with a higher resolution than a hard decoded bit. This higher resolution may be accomplished by using larger than 2 levels output from and Analogue to digital converter (ADC).

An alternative representation is to determine the likelihood ratio between a bit being a one to a bit being a zero and using more than 2 levels of resolution for representing this. The use of soft information is beneficial in a receiver when the receiver receives multiple copies of identical information or code words comprising at least in part identical information, as the bits or symbols represented by soft information can be combined and generating a new higher quality soft information of said bit or symbol.

The data quality indicator (DQI) of a data packet is a measure or a representation of the reception quality of the data packet in the receiver. The DQI represents the level of decodeability of the packet, and may be represented by a scalar, a vector or even a matrix. In general, a scalar is suggested by the inventor of the present invention as being sufficient.

In order to give some examples, the DQI may be a measure of the mean SINR (Signal to Interference Noise Ratio), the mean LLR (Log-Likelihood Ratio), or even the mean LLR as well as the variance of the LLR.

Higher order statistical moments of LLR than mean and variance may also in addition be used, such as for example the third order moment, in order to more precisely describe the probability density function of the LLR.

After T1, or alternatively after T2, the receiver RX, as well as the relay station RS, may transmit acknowledgements (positive or negative) in the form of ACK or NACK (respectively) to the sender TX. Thus, at the latest after T2, the transmitter TX knows which of the two nodes RX and RS that have received which of the packets A and B that the transmitter has transmitted.

According to the invention, retransmission of packets which the receiver RX has not received, or has received with errors, is delegated by the transmitter to the relay transceiver. This delegation can be done in a number of ways, some of which are:

The transmitter signals to the relay transceiver one or more packets that should be retransmitted by the relay transceiver, and possibly also which coding to use, i.e. how to form a so called composite packet, in the case that multiple packets are to be retransmitted as one new packet, i.e. a composite packet.

The transmitter signals to the relay transceiver which packet or packets to retransmit, but the relay transceiver is given "freedom" by the transmitter when it comes to which packets to encode into composite packets, and possibly also how to perform the combining. The relay transceiver may make these decisions based on, for example, ACK/NACK feedbacks from the receiver, RX, as well as, possibly, instant channel state information from the receiver.

The decision on which data packets to retransmit and how to encode them is delegated entirely to the relay transceiver by the transmitter.

The sender explicitly instructs the relay transceiver regarding which data packets that should be retransmitted to the receiver, and how they should be encoded into composite packets.

The relay transceiver may independently take the initiative to decide which data packets to retransmit, as well as when and how to encode them into composite packets.

Note that in versions of the invention, the relay may be ordered by the sender, or take its own decision, to send a single regular data packet, i.e. not a composite packet where two or more packets have been encoded together.

When the relay transceiver transmits a composite packet for the first time, it has created, by encoding, a composite packet ("CP") that is a new linear combination of two previous data packets. This CP is then received, FEC decoded if FEC is used, and decoded in the receiver, based on suitable a priori stored information, such as packets without errors as well as packets previously received in error and then stored as soft information.

In the case shown in FIG. 2a, the non-received or non-decoded packets are the packets A and B, and the encoded composite packet is thus comprised of packets A and B, in one embodiment encoded as A+B, which is shown at T3 in FIG. 2a. At T3, when the RS has transmitted the CP A+B, the receiver RS attempts to receive and encode the CP into the packets A and B by means of the previously stored (soft) information.

Several outcomes of the reception and ensuing attempted decoding in the receiver RX are possible. One such outcome is, if the received signal strength at the receiver is sufficient, that both A and B can be decoded in the receiver. It is also possible, depending on the previously stored soft information in the receiver, that only one of A and B can be decoded. In that case, the other packet's soft information will still be possible to update to an "enhanced version" of that packet's soft information, which may be used later when new CPs comprising that packet are received. Finally, it could also be the case that the receiver RX is unable to decode either of the data packets A and B.

In the case when the RX is unable to decode either packet A or packet B, the relay transceiver RS may, based on acknowledgement feedback (NACK) from the receiver RX, retransmit a new encoded composite packet, a CP, based on A and B, which is shown at T4 in FIG. 2a. However, the previously (T3) used A+B CP encoding is less suitable to use again at T4, as it is, in the finite coding field, linearly dependent with the previously (T3) transmitted A+B CP, which would thus not enable the receiver to decode A and B with only the two CPs. Hence, in the case shown here, it is better to re-transmit A and B as a CP with another linear encoding, e.g. A+2B, or A−B, etc. However, if doing so, it is not sufficient to limit the field size to GF(2), with numbers {0,1} only, but a larger field size is required, such as GF(4), with numbers {0,1,2,3}

Apart from using linear coding, which is to some extent similar in spirit to "chase combining" in that the same systematic information is sent multiple times, a concept which will be explained later in this text, it would be possible for the relay transceiver RS, to generate new parity information, similar in spirit to incremental redundancy based H-ARQ, and to concurrently mix information from different packets. Such HARQ is well known to those skilled in the field, and will thus not be described in further detail here.

FIG. 2b schematically shows an overview of the function of the system 100, using the reference numbers of FIG. 1: a sender, TX, 110 transmits data to a receiver, RX, 120. This data may also be "overheard" by a relay station, RS, 130, which is positioned so that it is in a more advantageous position to "overhear" transmissions between the receiver 110 and the receiver 120 than either of those two parties, i.e. the sender and the receiver.

The receiver RX 120 transmits feedback to the sender 110 in the form of quality values which represent the reception quality of data packets which the receiver has received with errors. The feedback can be transmitted directly to the sender 110, or, since it is overheard by the relay station 130, it can also be retransmitted from the relay station to the sender 110.

The feedback is then used by the sender in the manner which has been described above in connection with FIG. 2a, and as will be explained in more detail below.

Figure 3:
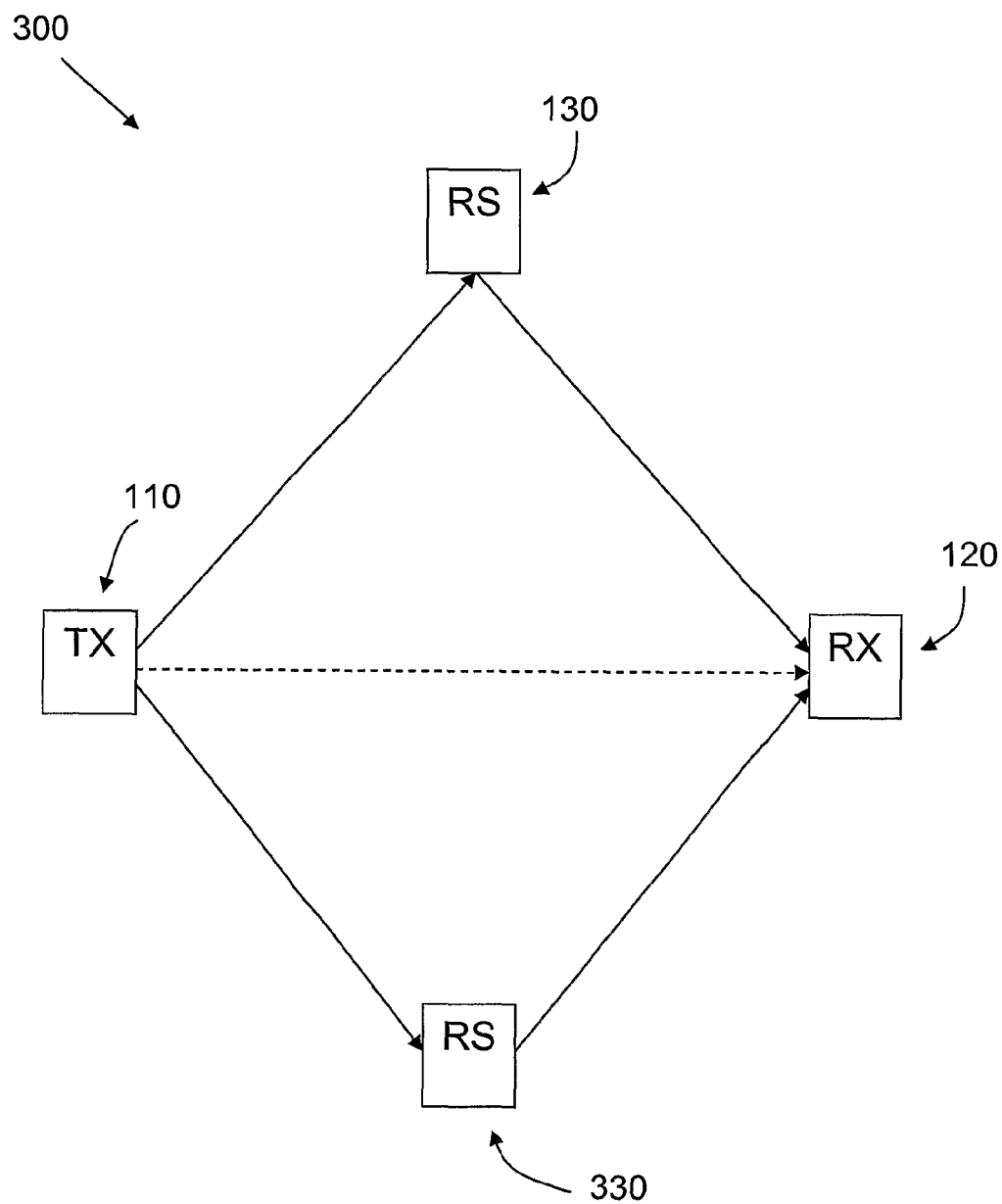
FIG. 3 shows a version of the system of FIG. 1, and, FIG. 4 shows an example of coding for use in the invention.

FIG. 3 shows another embodiment of a system 300 in which the invention may be applied, in which components which are the same as those of FIGS. 1 and 2b have retained their reference numbers. As can be seen from FIG. 3, a difference, as compared to the system shown in the previous drawings is that the system 300 shown in FIG. 3 uses a second relay transceiver 330, which is arranged "in parallel" with the first relay transceiver 130. Such systems are sometimes referred to as using "cooperative relaying". The invention may be used with more or less any amount of relay transceivers arranged in parallel.

When using multiple relays in parallel, as shown in FIG. 3, one embodiment of the invention would let the different relay transceivers be assigned code generators (or associated seeds to initiate the code generators) which are such that the different relay transceivers cannot generate composite packets which are linear combinations of CPs forwarded by one of the other relay transceivers.

In addition, it can be mentioned that the link and transport layer ARQ protocol could use the same sequence number, which may reduce the address overhead. However, the invention may be used when the link and transport layer ARQ protocols are separated.

In the text above, some notions have been used which will now be explained in depth. These notions are:
Soft Information,
DQI, Data Quality Information,
Coding,
Decoding,
Combining, including "chase combining".

Soft information: The level of reception quality of a data bit or symbol at the receiver.

Data quality information, DQI: The previously mentioned feedback to the transmitter regarding the receiver's soft information for a data packet is suitably the so called DQI, Data Quality Information, which is a measure or a representation of the reception quality of a data packet, composite or otherwise, in the receiver. The DQI represents the level of decodeability of the packet, and may be represented by a scalar, a vector or even a matrix. In general, a scalar is suggested by the inventor of the present invention as being sufficient. In order to give some examples, the DQI may be a measure of the mean SINR (Signal to Interference Noise Ratio), the mean LLR (Log-Likelihood Ratio), or even the mean LLR as well as the variance of the LLR. However, a version of feedback regarding DQI in its simplest form is a so called "NACK", negative acknowledge, since this informs the transmitter that the receiver hasn't received the data packet in question properly, or that the data hasn't been received at all.

Higher order statistical moments of LLR than mean and variance, may also in addition be used, such as for example the third order moment to more precisely describe the probability density function of the LLR. The DQI may in this invention be for "own" packets, i.e. packets which are intended for the receiver which receives them, or the DQI can be for "overheard" packets, i.e. packets which are received by a first receiver but destined for a second receiver, or the DQI may also be for CPs which contain information destined for multiple receiving nodes, the "own" node being one of those or not. The DQI may also comprise ACK-messages which indicate that a packet has been decoded, since an ACK merely signals full and perfect decodeability. For example, in the case of a DQI which is represented as a scalar of b bits, one of the $2^b$ possible words may correspond to an ACK. It can be pointed out that an ACK can signify, depending on the coding of a GP, that an "own" packet, an overheard packet or a CP, i.e. a packet with shared information, has been correctly received.

As described earlier, DQI is a measure which represents a GP's reception quality and is fed back from a receiver 120 to the sender 110 and maybe overheard by the relay transceiver 130. Thus, in a system of the invention, a receiver such as the receiver 120 shown in FIGS. 1, 2a and 2b and 3 will comprise means for measuring the DQI, and for transmitting back to the sender 110 a value representative of the measured DQI. The means for measuring the DQI will suitably comprise an analogue to digital converter, an ADC, in which the quality of the bits in a received bit stream or package can be measured or estimated as an aggregate for the whole packet.

Regarding the exact nature of the information which is fed back by the receiver to the sender, i.e. the DQIs, several embodiments are possible, including feedback of the quality per bit, or parameters which together with a known equation describe the estimated Probability Distribution Function and Cumulative Distribution Function, the PDF/CDFs of the "per bit quality" of a package. In addition, more compact statistical measures such as the moments of the estimated PDF/CDFs of the per bit quality (i.e. mean, variance etc.) are also possible to use in the present invention. Of course, feeding back per bit quality information would use a large amount of resources, and hence, more compact and resource efficient feedback formats like the PDF/CDF parameters or statistical moments are preferable. In particular, the mean of the quality is of interest to feedback. Further means of compressing information may also be used.

When discussing quality with respect to "per bit", two variants which are considered here are the coded bits and data bits. In the following, coded bits are used in a preferred embodiment, as it allows for fast feedback without any latency incurred by decoding.

Regarding the quality measure used as DQI, assume that the quality measure could be the log-likelihood ratio (LLR) measure for each decoded bit (or alternatively the coded bits). The LLR, which is commonly used in the field of coding, is often defined by the following expression:

$$L_i = \ln\frac{P(x_i = 0 \mid r_i)}{P(x_i = 1 \mid r_i)} \quad [1]$$

In expression [1] above, P is the probability, x is the value of a transmitted bit, and r is the received value. The received value r may be affected by channel attenuation h and noise n, so that r=hs+n, and x can be mapped to, for example, a Binary PSK signal s, in which case x may assume the values +1 and −1, corresponding to the binary values x=0 or 1 respectively. It can be pointed out that the likelihood-ratio, LR or $L_i$ in [1] above, may sometimes be defined with the reciprocal of the probability ratios.

To further illustrate the concept of LLR, consider an Additive White Gaussian Noise, AWGN, channel which is a reasonable approximation of a wireless channel, i.e.:

$$r=hs+n \quad [2]$$

In [2] above, h is a complex gain factor (including the amplifier gain on the transmit side as well as the channel gain) and n is complex Gaussian noise with a variance of $\sigma^2$, and s is a value selected from a signal constellation such as given by Quadrature Amplitude Modulation (QAM), Phase Shift Keying (PSK) or any other modulation method. As an example, for the case of Pulse Amplitude Modulation, PAM, the LLR is then known to be:

$$LLR=re\{2h^*r/\sigma^2\} \quad [3]$$

Combining equations [1] and equation [3], and using x=0 shows that s=1 is transmitted, and using x=1 will show that s=−1 is transmitted.

As an alternative to using the estimated mean LLR value as DQI to feed back to the transmitter, it would be possible to instead use the signal to interference noise ratio (SINR) for a GP.

However, in the following, in order to facilitate the reader's understanding of the invention, but not thereby limiting the invention, it will be assumed that the mean LLR for a data packet is used as the DQI for that data packet.

Figure 4:
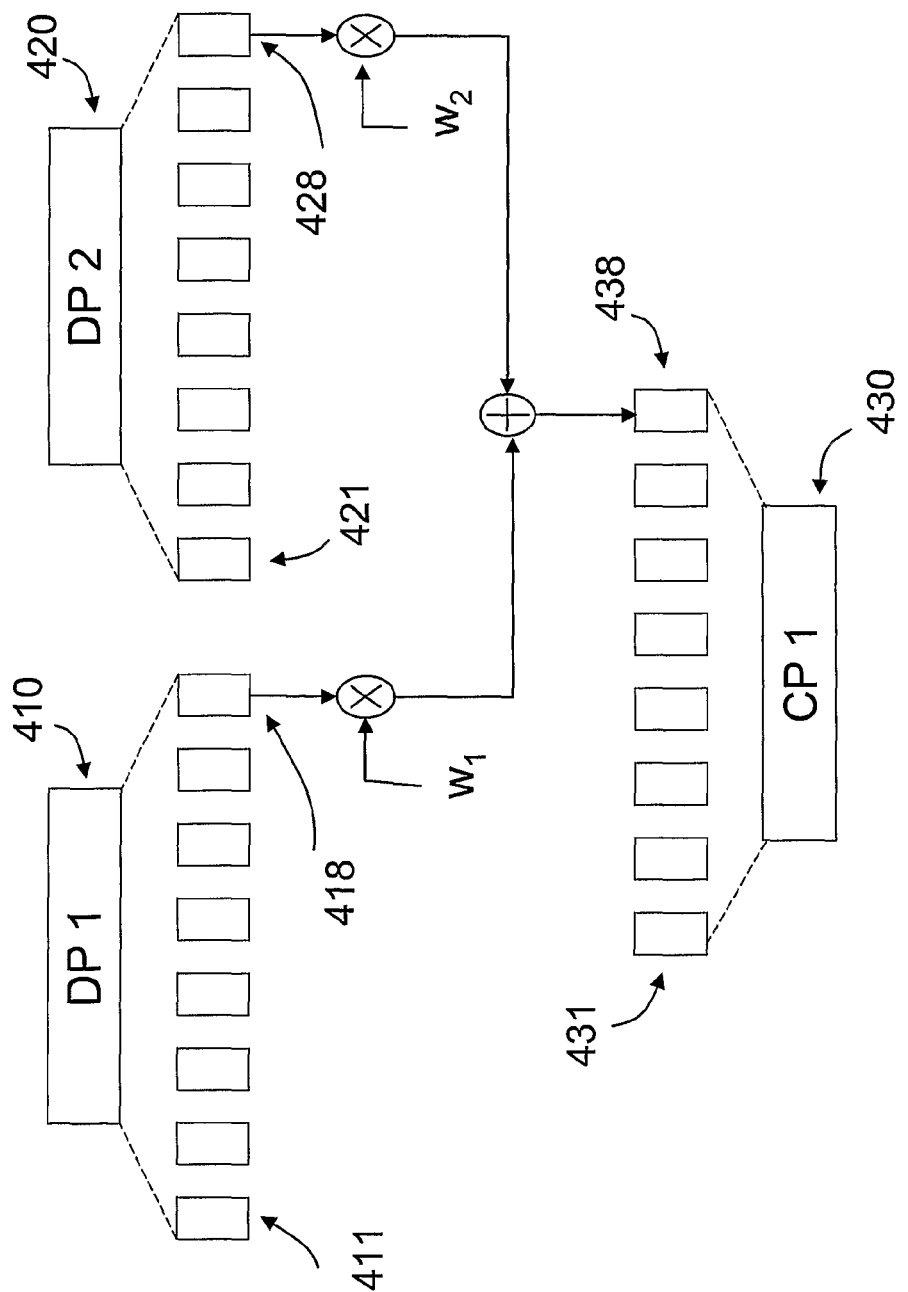

Coding:

Thus, as has emerged from the description above, coding is used by a sender such as the one 110 in FIG. 1, 2a, 2b or 3 in a system 100, 300, of the invention (e.g. a Base Station/NodeB/eNodeB in a cellular telephony system) in order to encode data packets into composite packets. FIG. 4 shows an example of coding which is used by the sender in a preferred embodiment of the invention. A first data packet DP1 410 is shown, as well as a second data packet DP2 420. As can be seen, each of the DPs 410, 420 comprises a number of segments; in the example shown in FIG. 4 there are eight segments in each DP, which is of course only an example of the number of segments in a DP.

The size of each segment, i.e. the number of bits comprised in the segment, depends on the type of coding used. For example, if so called finite field addition is used, and more specifically, if the finite field is a so called Galois Field (GF), the size of the segment, will depend on the size of the Galois field. If a $GF(2^8)$ is, used, i.e. a GF with 256 different elements, then 8 bits are required for the finite field, and hence also for each segment. When using binary representation, i.e. only 0's and 1's, the finite field is GF(2), which yields a single bit segment. The addition in GF(2), as shown in FIG. 4, is a bitwise XOR operation. The number of segments depends on the number of bits to in each data packet and the finite field size. For example, with L bit packets, the number of segments is ceil(L/m) for $GF(2^m)$, where "cell" is a function which rounds off upwards to the nearest integer.

As shown in FIG. 4, a first weighting factor $W_1$ is applied to each of the segments in the first data packet DP1, and a second weighting factor $W_2$ is applied to each of the segments in the second data packet DP2.

The two data packets DP1 and DP2 are added segment by segment in order to arrive at a Composite Package, shown as CP1, 330, in FIG. 4.

A mathematical representation of the coding shown in FIG. 4 is as follows:

$$C = W \cdot D \qquad [4]$$

Here, C is a vector which represents all general packets sent so far per transmitter, D is a vector of all (regular) packets encoded into a composite packet so far and W is a weight matrix. When a row in the weight matrix W contains only one non-zero element, a regular packet is sent, whereas multiple non-zero elements correspond to a composite packet.

In equation [4], the operations may be done in an infinite field, e.g. continuous or discrete, but is preferably performed in a finite discrete fields such as a Galois field $GF(p^m)$, where p is a prime number and m is a positive integer greater than zero.

It should be pointed out here that the invention is not limited to the coding shown in FIG. 4 and equation [4], other nonlinear coding schemes may also be used to merge/mix/code different pieces of information, in particular information designated to different users, as is the case with the individual packets in the composite packets of the present invention.

Combining:

As has emerged from the description above, the receiver 120 uses a combining technique adapted for the presence of composite data packets as well as the regular data packets, on received packets in order to enhance the likelihood to receive packets without errors. One way of combining received data packets is by so called Chase combining. However, since the present invention can use the so called composite packets, the classical chase combining technique cannot be used; instead a suitable combining variant is described below.

We exemplify the chase combining based like operation, modified for composite packets, with coding in a Galois Field (2), GF(2), but this is as an example only, the invention is in no way limited to this case. Assume that for each bit of a packet $D_1$ where $C_1 = D_1$, (where "C" is C of equation [1] above) designated for a user $u_1$, and a packet $D_2$ where $C_2 = D_2$ designated for a user $u_2$, the combining and decoding block 620 in the transceiver 120, 130 forms (i.e. encodes) a composite packet $C_3 = D_1 \oplus D_2$ in GF(2), i.e. bitwise XOR. Let's focus on $u_1$ and assume that it receives degraded versions of $C_1, C_2, C_3$, and based on this $u_1$ wants to estimate $D_1$.

Let's now calculate and update an improved LLR value for $D_1$. First, one can see that it is possible to equivalently write $D_1 = C_3 \oplus D_2$. We can obtain the likelihood ratio based on the observations of received generic packet $C_2$ and $C_3$, i.e. $r_2$ and $r_3$ respectively. The resulting equation, here referred to as equation 3, is shown in appended FIG. 5.

In the rightmost side of equation 3, (2) has been used. Now, equation 3 allows an updated (per bit) LLR for $D_1$ to be calculated, as shown in (5) below.

$$L'_{11} = L_{11} + \ln \frac{1 + e^{L_{21} + L_{31}}}{e^{L_{21}} + e^{L_{31}}} \qquad [5]$$

In (5), we have introduced a notion $L_{ju}$ for the LLR indicating which $j^{th}$ GP, $j \in \{1,2\}$ packet it is and which $u^{th}$ node that receives it.

Similarly, user 2 may update and improve its "log-likelihood" (for each respective bit) by using:

$$L'_{22} = L_{22} + \ln \frac{1 + e^{L_{12} + L_{32}}}{e^{L_{12}} + e^{L_{32}}} \qquad [6]$$

Decoding:

One example of a decoding method which may be used in a transceiver such as the receiver 120 of FIGS. 1, 2a, 2b and 3 of the present invention is so called "Incremental redundancy": For incremental redundancy based MU-HARQ, the well known so called "belief propagation algorithm", also sometimes referred to as "the message passing algorithm" may be used for decoding. The benefit of using belief propagation is that it does not limit the system of the invention to simple bitwise XOR-operations between packets, other codes such as for example convolution codes, turbo codes, LDPC codes etc could be used. Another benefit in general for incremental redundancy is that additional coding gain is obtained, which improves the performance, or alternatively, the same performance level can be achieved at lower SNRs.

In an alternative embodiment, one or more of the receivers in the system can transmit not only DQI but also CQI, Channel Quality Indicator, to the transmitter in the system. The CQI is a measure of the channel quality, and is preferably expressed as Signal to Interference and Noise Ratio (SINR) or Signal to Noise Ratio (SNR).

Figure 6:
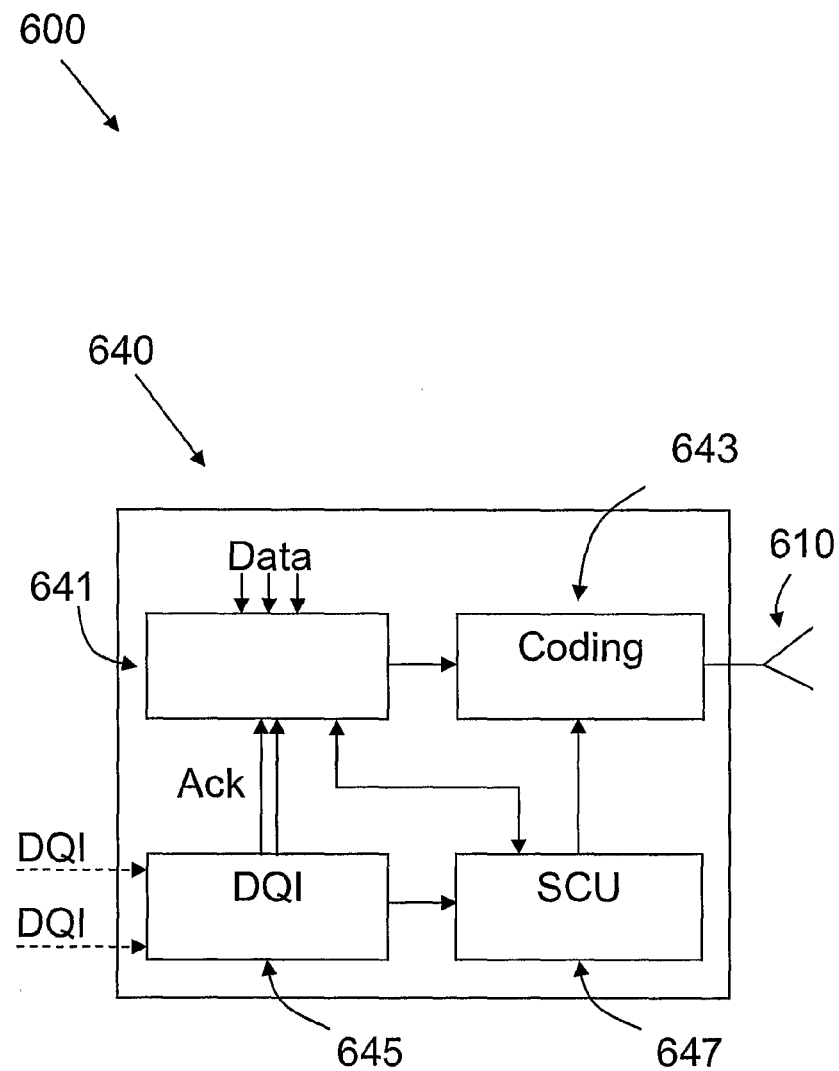
FIG. 6 shows functional blocks in a first transceiver of the invention.

A block diagram of functional blocks in a transceiver 600 for use as a transmitter or a relay transceiver of the invention is shown in FIG. 6. As mentioned previously, in one aspect of the invention, the relay transceiver can operate more or less autonomously, in which case it basically needs the same functional blocks as the transmitter. Naturally, in applications where the relay transceiver is controlled to some extent by the transmitter, the relay transceiver does not need, for example, the scheduling and coding unit, if the corresponding functions are performed by the transmitter, and the relay transceiver is merely a "slave transceiver".

As can be seen in FIG. 6, the transceiver 600 comprises one block 645 which receives the DQIs (or some representation of the soft information from a receiver) from the receiver or receivers in the system, as well as comprising a scheduling and coding unit, SCU 647, and one unit "coding", 643 which encodes data before it is transmitted. In addition, the transmitter 600 also comprises a unit 641 which receives data for transmission, i.e. the unit 641 will have one or more data buffers.

The unit 641 stores data packets to be transmitted until a packet has been received by the intended user, which can be determined from feedback from the intended user, i.e. the receiver, by means of acknowledgements of the packets. The SCU 647, with knowledge of the content residing in 641, determines which packets to encode jointly, i.e. as composite packets, and with what weights. Hence, at transmission, the SCU 647 orders packets to be sent (or equivalently fetched and forwarded) to the coder 643, where the coding operation takes place, suitably in the manner described above under the heading "coding". As shown in FIG. 6, the transmitter also comprises an antenna 610 for sending and receiving information to and from the other parties in the system. The symbolic antenna 610 is also meant to show that the transmitter 600 comprises a receiver and a transmitter, as well as an antenna. These components will not be described in detail here, since they are well known to those skilled in the field. However, the antenna and receiver/transmitter can also be used for receiving instructions from the sender regarding the degree of autonomy with which the relay transceiver may act, as will be described below in this text.

The encoder 643 essentially works as has been described above in connection with FIG. 4, and will therefore not be explained in more detail here. The function of the DQI unit 645 is basically to receive the DQI values from the receiver or receivers in the system, and to distribute the DQI values to the SCU 647 and the data unit 641.

The function of the SCU 647 is as follows: The SCU 647 decides which packet or packets to send in the form of packets, composite or not, and which code weights to use, to which end the SCU uses knowledge of what the data unit or buffer 641 buffer contains, as well as a value which is representative of the reception quality of the previously transmitted GPs, i.e. the DQI values which have been received by the receiver 600.

In one embodiment, the units 654, 647, 640 and 643 are all comprised in a computing unit such as, for example, a microcomputer. However, these units can also be comprised in various combinations of more than one computing unit, and may also rely on a memory external to the computing unit.

Figure 7:
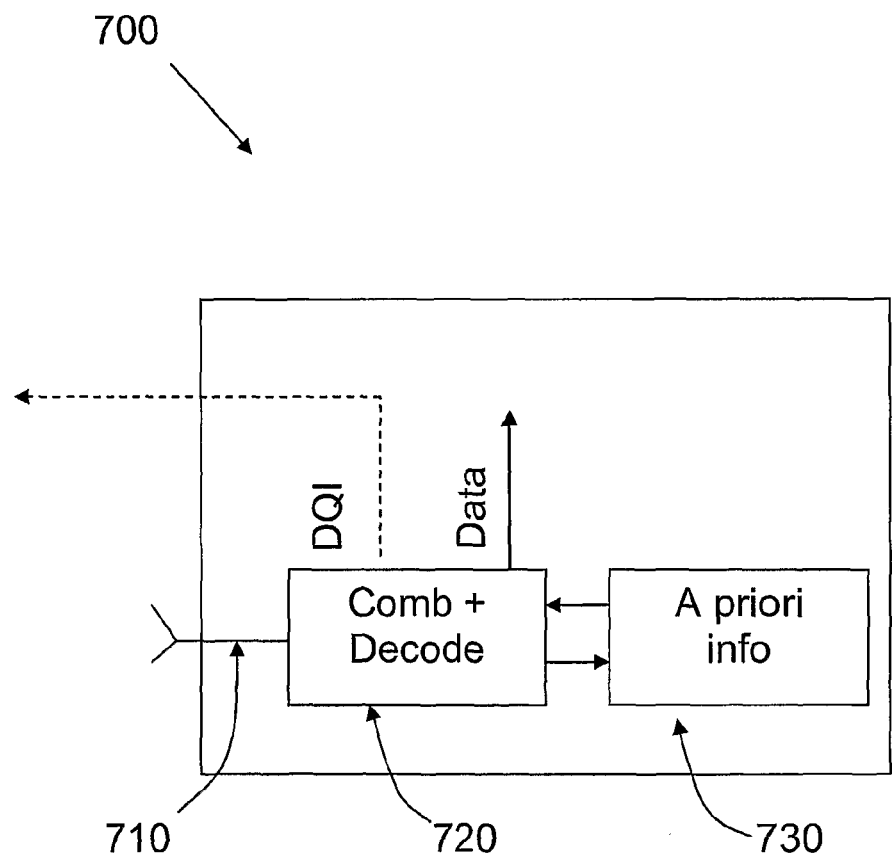
FIG. 7 shows functional blocks in a second transceiver of the invention.

FIG. 7 shows a functional block diagram of a receiver 700 for use in the invention, such as the receiver shown in FIGS. 1 and 3. As can be seen in FIG. 7, the receiver, or rather transceiver, 700, comprises an antenna 710 for exchanging information with the sender (RBS/NodeB/eNodeB) in a cellular system) of the system, a combining and de-coding block 720 and an "a priori known information block" 720. The function of the antenna 710 is self evident, i.e. to aid in the transmission and reception of data. The function of the blocks 710 and 720 is as follows:

The transceiver 700 attempts to decode any and all packet it receives. In so doing, it may need to use a priori information of previously received and stored data packets, composite or not. Typically, this a priori information is LLR information per bit, or just digitized received symbols. The a priori D information for previously received packets is thus stored in a memory in the receiver, suitably in the a priori known information block 720, and may preferably be improved upon by updates when a packet is received by the transceiver 700.

A basic idea in the receiving transceiver 700 of the invention is to perform decoding and combining of pieces of information such as, for example, data packets. The data packets should have been received on least at two different occasions, with intermediate feedback to the transmitter having been carried out by the transceiver at least once. The decoding and combining is suitably carried out in the manner described under those headings in the description above.

The central idea is to enhance information destined for oneself, i.e. the transceiver 700, by using at least the following:
  soft undecoded information,
  decoded mixed information, i.e. in the form of composite packets.

Figure 8:
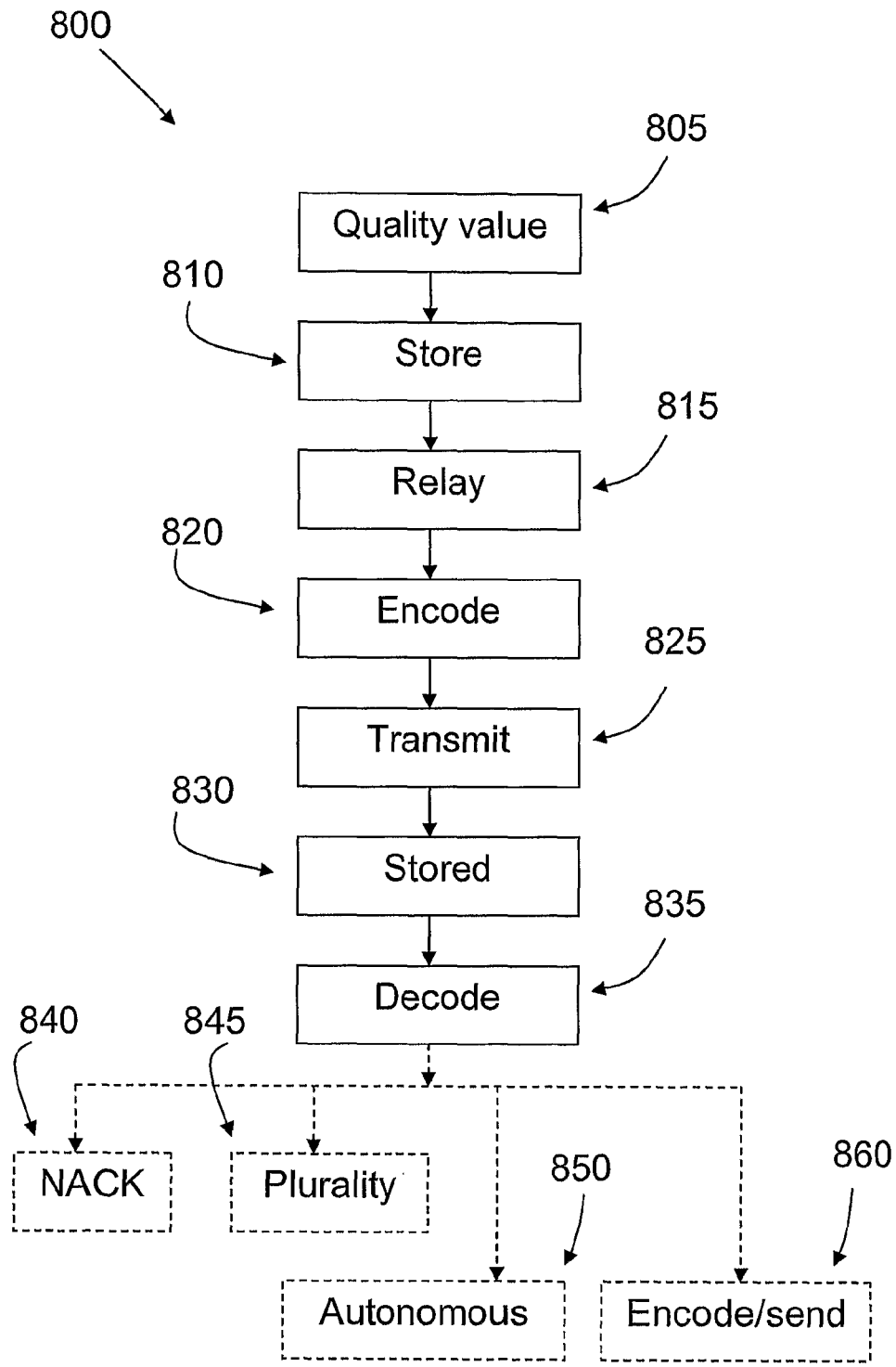
FIG. 8 shows a rough block diagram of a method of the invention.

FIG. 8 shows a rough block diagram of a method 800 of the invention, Steps which are options or alternatives are shown with dashed lines. Since much of the method has emerged from the description above, the steps in the flow chart will only be described in brief below.

Thus as indicated in step 805, the receiver in the inventive system transmits quality values to the sender which represent the reception quality of data packets which the receiver has received with errors, and, as shown in step 810, the receiver stores information regarding a number of received data packets.

Step 815 shows that the method involves the use of at least a third transceiver as a relay transceiver which can receive and forward transmissions between the sender and the receiver, and as indicated in step 820, both the relay transceiver and the sender are able to encode data packets into one or more composite packets, and they are both also able to transmit, step 825, the composite packets to the receiver.

Step 830 shows that the stored information in the receiver comprises the data in correctly received packets and information regarding the reception quality of packets received with errors as well as information representative of the data of those packets. The stored information is used by the receiver to decode, step 835, composite packets, thereby extracting the data in the packets which comprise the composite packets.

As indicated in step 840, in one embodiment of the method, the quality value which is transmitted is a NACK message for the data packet in question, and as shown in step 845, in another embodiment, the quality value can be a value which represents one of a plurality of, reception quality values of the data packet in question at the receiver.

As indicated in step 855, in a further embodiment the quality values from the receiver regarding packets received in error are used in order to encode and send composite data packets to the receiver, with the composite packets being packets that comprise at least one previously transmitted packet which has been received by the receiver with errors, the composite packets being so encoded that the receiver's decoding can identify both the individual packets in the composite packet and the data in those packets.

As shown in step 850, the relay transceiver can have various degrees of autonomy, such as:
  The sender delegates to the relay transceiver the re-transmission of one or more packets which have not been received with errors by the receiver.
  The sender also delegates to the relay transceiver to decide how to encode said packets into said composite packets, and to decide which of said packets received with errors that should be encoded into said composite packets.

The sender instructs the relay transceiver regarding which packets it should encode together to form said composite packets.

The sender explicitly instructs the relay transceiver regarding which data packets that should be retransmitted to the receiver, and how they should be encoded into composite packets.

The relay transceiver independently takes the initiative to decide which data packets to retransmit and how to encode them into composite packets.

The invention is not limited to the examples of embodiments described above and shown in the drawings, but may be freely varied within the scope of the appended claims.

The invention claimed is:

1. A receiving transceiver, comprising:
   a receiver operative to receive a composite packet that is autonomously transmitted from a relay transceiver, wherein data packets are error correction encoded to form the composite packet and include a data packet the receiving transceiver has received with errors and a data packet the receiving transceiver has received without errors;
   a transmitter operative to send to the relay transceiver quality values representative of a reception quality of data packets received with errors;
   memory operative to store data packets and information associated with data packets received with errors; and
   a controller operative to decode the composite packet to obtain the data packets,
   wherein autonomously transmitted from a relay transceiver includes the relay transceiver being delegated an ability to determine whether to re-transmit the data packet the receiving transceiver has received with errors.

2. The transceiver of claim 1, wherein the quality values comprise ARQ/HARQ NACK indications.

3. The transceiver of claim 1, wherein the quality values comprise a Data Quality Indicator (DQI).

4. The transceiver of claim 3, wherein the DQI is a scalar value.

5. The transceiver of claim 1, wherein the controller is operative to identify individual packets in the composite packet, and the data in those packets.

6. The transceiver of claim 1, wherein the memory is operative to store at least one data packet received without error.

7. The transceiver of claim 1, wherein the memory is operative to store soft information for a packet received with error.

8. The transceiver of claim 1, wherein the memory is operative to store data packets and information about data packets received with errors for a limited duration.

9. The transceiver of claim 8, wherein the receiver is further operative to receive from a sending transceiver instructions on which data to store, and for what duration, or to discard.

10. The transceiver of claim 1, wherein the data packets are linearly combined to form the composite packet.

11. The transceiver of claim 1, wherein the controller is further operative to decode the composite packet using at least one of the stored data packets and the information associated with the data packets received with errors to obtain the data packets.

12. The transceiver of claim 1, wherein the memory is further operative to store a previously received composite packet, wherein the data packets of the previously received composite packet are a different linear combination of the data packets of the composite packet; and
   wherein the controller is further operative to decode the composite packet using the previously received composite packet to obtain the data packets.

13. The transceiver of claim 1, wherein autonomously transmitted from a relay transceiver includes the relay transceiver being delegated an ability to determine whether to re-transmit the data packet the receiving transceiver has not received with errors.

14. The transceiver of claim 1, wherein autonomously transmitted from a relay transceiver includes the relay transceiver being delegated an ability to determine how the data packets are error correction encoded to form the composite packet.

15. The transceiver of claim 1, wherein autonomously transmitted from a relay transceiver includes the relay transceiver being delegated an ability to determine which of the data packets are error correction encoded to form the composite packet.

* * * * *